(12) United States Patent
Guda et al.

(10) Patent No.: US 11,861,207 B2
(45) Date of Patent: *Jan. 2, 2024

(54) MANAGEMENT OF ERASE SUSPEND AND RESUME OPERATIONS IN MEMORY DEVICES

(71) Applicant: Micron Technology, Inc., Boise, ID (US)

(72) Inventors: Chandra M. Guda, Fremont, CA (US); Suresh Rajgopal, San Diego, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,329

(22) Filed: Dec. 27, 2021

(65) Prior Publication Data

US 2022/0121385 A1 Apr. 21, 2022

Related U.S. Application Data

(63) Continuation of application No. 16/709,614, filed on Dec. 10, 2019, now Pat. No. 11,237,754.

(51) Int. Cl.
*G06F 3/06* (2006.01)

(52) U.S. Cl.
CPC .......... *G06F 3/0652* (2013.01); *G06F 3/0608* (2013.01); *G06F 3/0659* (2013.01); *G06F 3/0673* (2013.01)

(58) Field of Classification Search
CPC .... G06F 3/0652; G06F 3/0608; G06F 3/0659; G06F 3/0673; G06F 3/0683

USPC ......................................................... 711/154
See application file for complete search history.

(56) References Cited

U.S. PATENT DOCUMENTS

| 10,203,884 | B2 | 2/2019 | Madraswala et al. |
| 10,643,711 | B1 | 5/2020 | Yuan et al. |
| 11,036,544 | B2 | 6/2021 | Park |
| 2012/0254515 | A1 | 10/2012 | Melik-Martirosian et al. |
| 2014/0293704 | A1 | 10/2014 | Ghalam et al. |
| 2015/0149696 | A1 | 5/2015 | Ong et al. |
| 2015/0205539 | A1 | 7/2015 | Moon et al. |
| 2017/0262229 | A1 | 9/2017 | Ochi et al. |
| 2017/0285969 | A1 | 10/2017 | Madraswala et al. |
| 2019/0392910 | A1* | 12/2019 | Lee .................... G11C 16/3459 |

(Continued)

OTHER PUBLICATIONS

PCT International Search Report and Written Opinion for International Application No. PCT/US2020/064120 dated Mar. 29, 2021, 10 pages.

*Primary Examiner* — Fernando Hidalgo
(74) *Attorney, Agent, or Firm* — LOWENSTEIN SANDLER LLP

(57) ABSTRACT

A processing device determines a duration for executing a portion of an erase operation based on a plurality of execution times of erase operations performed on a memory device. The processing device executes the portion of the erase operation. Responsive to detecting expiration of the duration for executing the erase operation, the processing logic executes an erase suspend operation to suspend the erase operation. Responsive to detecting completion of the erase suspend operation, the processing logic executes one or more commands. The processing device further executes an erase resume operation to resume the erase operation on the memory device.

20 Claims, 6 Drawing Sheets

(56) References Cited

U.S. PATENT DOCUMENTS

2020/0126625 A1 4/2020 Park
2020/0381057 A1* 12/2020 Park .................... G11C 11/5671

* cited by examiner

MANAGEMENT OF ERASE SUSPEND AND RESUME OPERATIONS IN MEMORY DEVICES

RELATED APPLICATIONS

This application is a continuation application of co-pending U.S. patent application Ser. No. 16/709,614, filed on Dec. 10, 2019, which is herein incorporated by reference.

TECHNICAL FIELD

The present disclosure generally relates to a memory sub-system, and more specifically, relates to the management of erase suspend and resume operations in memory devices.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
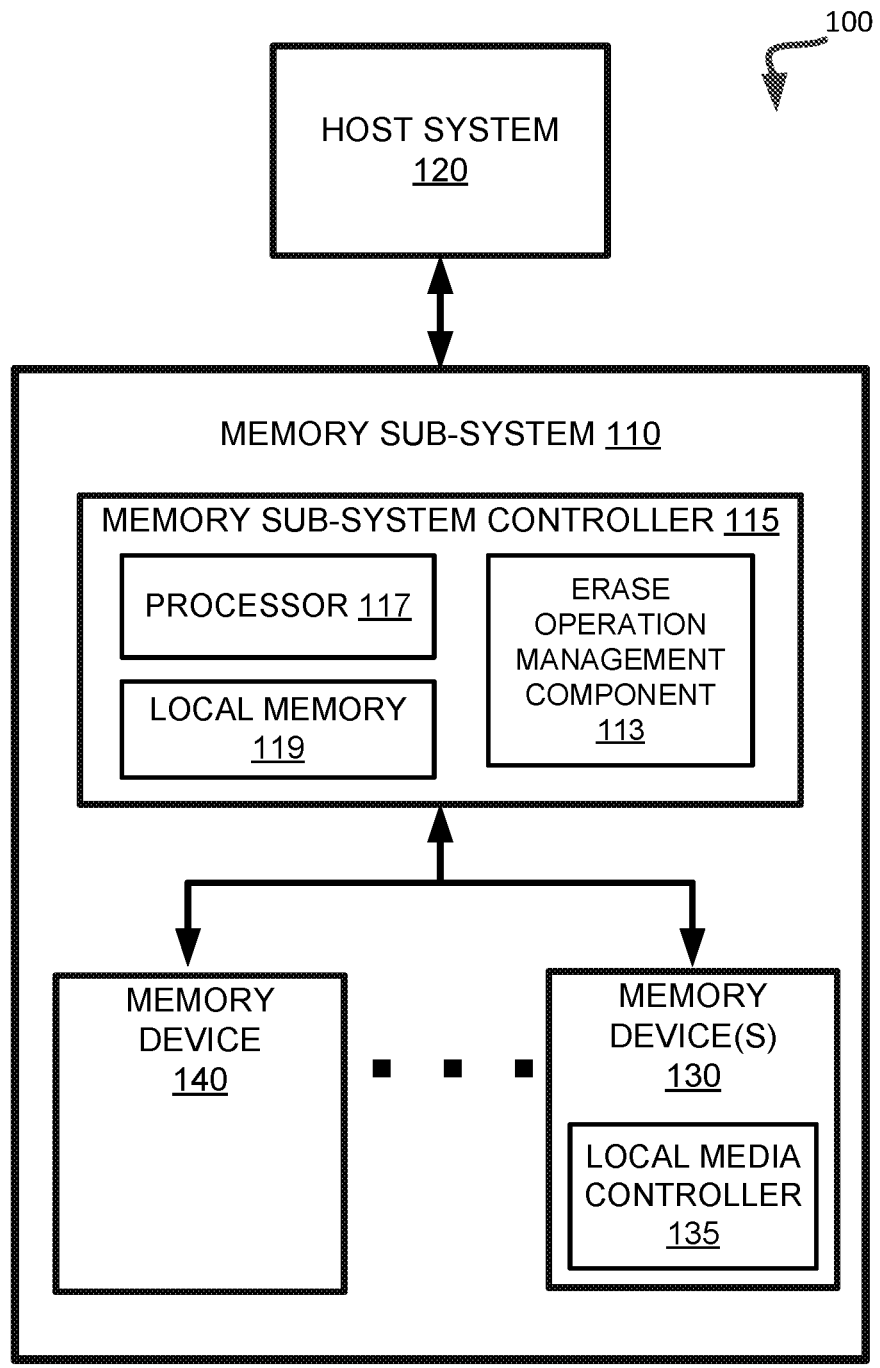
FIG. 1 illustrates an example computing environment that includes a memory sub-system, in accordance with some embodiments of the present disclosure.

Aspects of the present disclosure are directed to the management of erase suspend and resume operations in memory devices of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A conventional memory sub-system can perform an erase operation to remove the data stored at the memory devices included in the memory sub-system. For example, in order to rewrite a set of pages contained in a block, the conventional memory sub-system can perform an erase operation that erases the data stored at the whole block. For some memory devices, blocks are the smallest area that can be erased. Each block is comprised of a set of pages. A die consists of a number of blocks. When an erase operation is in progress, no other operations are allowed to the same die.

Performing such an erase operation for the whole block every time pages of memory are rewritten can utilize a large amount of time and can cause increased latency for other internal operations, as well as host-initiated operations such as read operations or write operations that will not begin until the erase operation for the whole block has completed. The increased latency of the overall memory device can adversely impact the level of quality of service (QoS) of the memory device and can result in inconsistent performance of the memory device due to the unpredictable latency that can be introduced by erase operations.

Conventional memory sub-systems utilize a backend sub-system flash controller (e.g. hardware or firmware controller) to generate erase suspend and erase resume operations to a memory device to enable execution of input/output (IO) operations on the memory device in between an erase suspend and an erase resume operations. However, the repeated execution of erase suspend and erase resume operations by the controller can incur further latencies as the number of outstanding commands waiting on the erase completion increases. Further, the performance overhead of generating numerous suspend and resume operations on the firmware of the memory sub-system can be significant, which can further degrade the QoS of the memory sub-system.

Aspects of the present disclosure address the above and other deficiencies by having a memory sub-system that enables deterministic execution of an erase operation by providing sequences of time periods for executing the erase operation (e.g. erase service time periods), interleaved with alternate time periods for executing memory access commands (e.g. command service time periods) on a memory device. In implementations, erase service time periods can be measured in terms of erase pulses. An erase pulse is the smallest operation under the erase lifecycle.

The execution of erase service time periods and command service time periods can be managed internally by the memory device. In this case, the flash controller is only responsible for issuing read commands and write commands within the command service time periods, thus relieving the controller from the overhead of generating erase suspend and resume operations. An erase suspend operation can be executed within the erase service time periods to enable the memory device to execute the memory access commands while the erase operation is suspended. Similarly, an erase resume operation can be executed within the erase service time periods to resume the erase operation on the memory device when the execution of the memory access commands is complete.

In one implementation, the memory sub-system receives a request to perform an erase operation on a memory device. The memory sub-system can execute a sequence of predetermined time periods to service the erase operation as well as memory access commands alternatively, until the execution of the erase operation is complete. In implementations, the erase service time periods can be measured in terms of erase pulses. In some implementations, the memory sub-system can define the number of erase service time periods within the sequence, the number of command service time periods within the sequence, the duration of the erase service time period, as well as the duration of the command service time period. In one example, the sequence can include an erase service time period of T1 duration, followed by a command service time period T2, followed by a next erase service time period T1, and so on, as explained in more details herein below. During the erase service time period, the memory sub-system can execute sub commands including an erase resume operation (for example, to resume an erase operation that has been previously suspended), followed by executing at least a portion of the erase operation, followed by an erase suspend operation, or an erase complete operation. The memory sub-system can receive a notification when the suspend operation completes, thus indicating that the next time period for servicing commands can start. The memory sub-system can then start the command service time period, the memory device can receive memory access commands and can execute the commands within the command service time period. When the execution of the erase operation completes, the memory sub-system can determine the actual execution time of the erase operation and the memory access commands. The memory sub-system can then adjust the erase service time period and the command service time period accordingly.

Advantages of the present disclosure include, but are not limited to, an improved quality of service for read operations and write operations for the memory sub-system, as an erase operation can be suspended during predetermined intervals to perform the read and write operations. For example, techniques of defining and executing erase service time periods and command service time periods described herein allow a memory sub-system to define deterministic slices of time for erase operations and command operations, thus enabling a deterministic QoS for the memory sub-system. The techniques further allow the memory sub-system to manage the erase operation lifecycle (e.g. resume, erase, and suspend) internally within the memory device, thus reducing the overhead of managing this lifecycle by the memory sub-system. Moreover, the techniques provide for a more predictable overall latency of the memory sub-system because of the ability to continue to service memory access commands (e.g. read, write, garbage collection commands) during adjustable time periods to accommodate variable queue depth of commands, while executing an erase operation. Additional details of these techniques are provided below with respect to FIGS. 1-7.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and a non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes a negative-and (NAND) type flash memory and write-in-place memory, such as threedimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point type and NAND type flash memory are described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes erase operation management component 113 that can be used for managing the erase suspend and erase resume time periods in the memory sub-system. In certain implementation, erase operation management component 113 can execute a sequence of predetermined time periods to service the erase operation as well as alternate time periods to service memory access commands until the execution of the erase operation is complete. In implementations, erase service time periods can be measured in terms of erase pulses. An erase pulse is the smallest operation under the erase lifecycle. In some implementations, erase operation management component 113 can define the number of erase service time periods within the sequence, the number of command service time periods within the sequence, the duration of the erase service time period, as well as the duration of the command service time period. In one example, the sequence can include an erase service time period of T1 duration, followed by a command service time period T2, followed by a next erase service time period T1, and so on. Within the erase service time period, erase operation management component 113 can execute sub commands including an erase resume operation (for example to resume an erase operation that was previously suspended), followed by executing at least a portion of the erase operation, followed by an erase suspend operation.

Erase operation management component 113 can then receive a notification from the memory device when the suspend operation completes, thus indicating that the next time period for servicing commands can start. Erase operation management component 113 can start the command service time period. The memory device can receive memory access commands from the controller and can execute the commands within the command service time period. When the command service time period elapses, the next erase service time period is initiated. Erase operation management component 113 can then execute an erase resume operation to resume the erase operation that was previously suspended. When the execution of the erase operation completes, the memory sub-system can send data related to the actual execution time of the erase operation and the memory access commands to the controller. The controller can then adjust the erase service time period and the command service time period accordingly, for example, to allow for higher degree of reclamation on the memory device or to accommodate a change in the command queue depth of the memory sub-system. Further details with regards to the operations of erase operation management component 113 are described below.

Figure 2B:
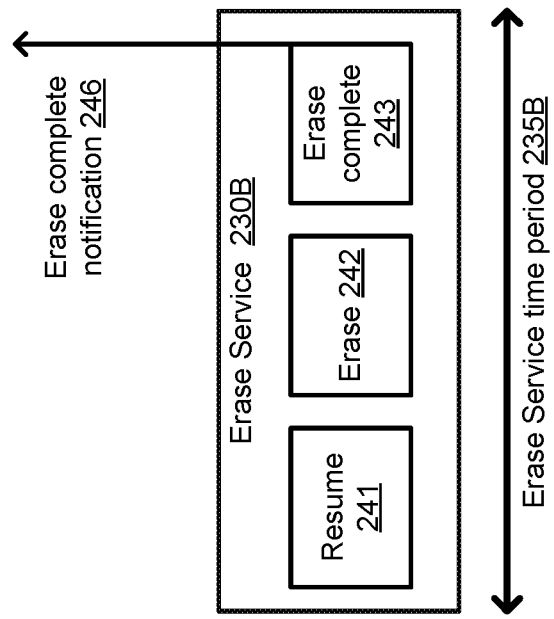
FIG. 2B illustrates another example of an erase service time period for executing a resume, erase, and erase complete operations in a memory sub-system for erase operation management, in accordance with some embodiments of the present disclosure.
Figure 2A:
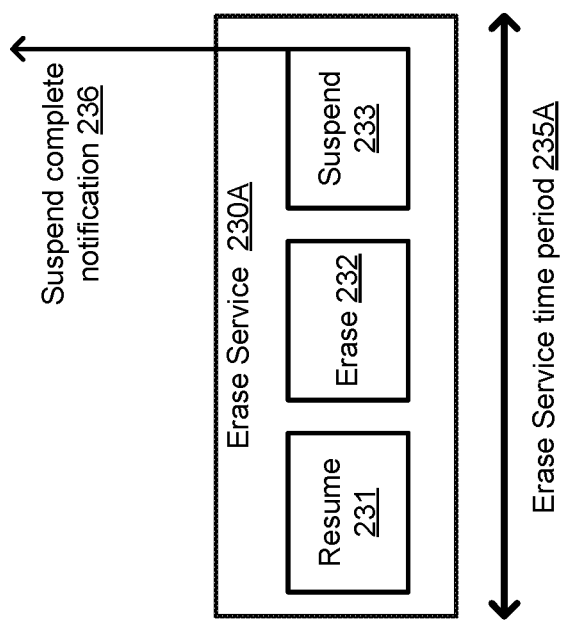
FIG. 2A illustrates an example of an erase service time period for executing a resume, erase, and suspend operations in a memory sub-system for erase operation management, in accordance with some embodiments of the present disclosure.

FIG. 2A and FIG. 2B illustrate examples of an erase service time period in memory sub-system 110 for erase operation management in accordance with some embodiments of the present disclosure. Memory sub-system 110 can execute an erase operation over a number of time periods interleaved with alternate time periods for executing internal or external memory access operations. Memory access operations initiated external to the memory subsystem may refer to input/output (IO) operations (e.g. read, write). Internal memory access operations may refer to garbage collection and wear leveling, which initiates read or write operations that are internal to the memory subsystem.

In one embodiment, erase service 230A-B can contain sub-commands including resume, erase, and suspend if a portion of the erase operation is performed but the full erase operation has not completed yet. In other embodiments, erase service 230A-B can contain sub-commands including resume, erase, and complete if the full erase operation is completed during the current erase service 230A-B. Yet in another embodiment, erase service 230A-B can contain sub-commands including erase and suspend if the current erase service is the first erase service time period to be executed, thus no suspended erase operation to be resumed.

FIG. 2A illustrates an example of an erase service time period for executing a resume, erase, and suspend operations in memory sub-system 110 for erase operation management, in accordance with some embodiments of the present disclosure. In an embodiment, erase service 230A can be executed by the processing logic within erase service time period 235A to perform at least a portion of an erase operation. Erase service time period 235A can contain resume erase operation 231 to resume an erase operation that was previously suspended. One the other hand, if erase service time period 235A is the first time period to be executed for performing the erase operation, erase resume operation 231 can be omitted. In one implementation, if erase resume operation 231 is omitted, the processing logic can adjust erase service time period 235A (e.g. by making it shorter than an erase resume time period where erase resume operation is performed), to improve the overall time spent in processing the erase operation. In another implementation, if erase resume operation 231 is omitted, the processing logic can allow the erase operation 232 to be performed for a longer time, thus keeping the erase resume time period 235A unchanged.

When erase resume operation 231 completes, memory sub-system 110 can execute at least a portion of the erase operation at 232. In one implementation, the portion of time allocated for performing the erase operation 232 can be determined based on erase service time period 235A, the time needed to erase resume 231, if needed, and the time needed for erase suspend 233. For example, if erase service time period 235A is 5000 microseconds, time needed for erase resume 231 is 200 microseconds, and time needed for erase suspend 233 is 400 microseconds, then time allocated for erase operation 232 is 5000−200−400=4400 microseconds. When the time allocated to erase operation 232 elapses and the erase operation has not completed yet, memory sub-system 110 can execute erase suspend operation 233 in order to enable the next command service time period to be executed on memory device 130.

Erase suspend operation 233 can be performed by memory sub-system 110 to temporarily stop the execution of the current erase operation, in order to free memory device 130 for other memory access commands to be executed. In implementations, because memory device 130 can perform certain preparation tasks to go into erase suspend mode, the time erase suspend operation 233 takes can vary based on, for example, the age and health of memory device 130. Accordingly, memory sub-system 100 can set the erase service time period 235A to include the maximum time an erase suspend operation can take. Therefore, erase suspend operation 233 can send notification 236 to the controller when the suspend operation actually completes, to signal that the next time period can start. The suspend complete notification 236 can enable memory sub-system 110 to start the next command service time period without waiting for erase service time period 235A to elapse, thus eliminating potential time waste between the actual completion of the suspend operation and the end of erase service time period 235A.

When memory sub-system 110 receives the suspend complete notification 236, memory sub-system 110 can end erase service time period 230A and can start the following command service time period, as explained in more details herein below. In implementations, the suspend complete notification 236 can be a message sent from memory device 130 to the controller, a change in a predetermined memory location that can be monitored by the controller, etc.

FIG. 2B illustrates an example of an erase service time period for executing a resume, erase, and erase complete operations in memory sub-system 110 for erase operation management, in accordance with some embodiments of the present disclosure. In an embodiment, erase service 230B can be executed by the processing logic within erase service time period 235B to perform at least a portion of an erase operation. Erase service time period 235B can contain resume erase operation 241 to resume an erase operation that was previously suspended. One the other hand, if erase service time period 235B is the first time period to be executed for performing the erase operation, erase resume operation 241 can be omitted. In one implementation, if erase resume operation 241 is omitted, the processing logic can adjust erase service time period 235B (e.g. by making it shorter than an erase resume time period where erase resume operation is performed), to improve the overall time spent in processing the erase operation. In another implementation, if erase resume operation 241 is omitted, the processing logic can allow the erase operation 242 to be performed for a longer time, thus keeping the erase resume time period 235B unchanged.

When erase resume operation 241 completes, memory sub-system 110 can execute at least a portion of the erase operation at 242. In this case the erase operation 242 can execute the last portion of the full erase operation, followed by an erase complete operation 243. In one implementation, the portion of time allocated for performing the erase operation 242 can be determined based on erase service time period 235B, the time needed for erase resume operation 241, if needed, and the time needed to complete the rest of the erase operation at erase complete operation 243. For example, if erase service time period 235B is 5000 microseconds, time needed for erase resume 241 is 200 microseconds, and time needed for erase complete 243 is 200 microseconds, then time allocated for erase operation 242 is 5000−200−200=4600 microseconds. In this example, erase operation 242 can complete the full erase operation within the 4600, thus triggering the execution of erase complete operation 243. In certain implementation, erase operation 242 can complete the overall erase operation in less time than the time allowed within erase service time period 235B because the last portion of executing the overall erase operation can be shorter. In this case, memory sub-system 110 can trigger the execution of erase complete operation 243 sooner, causing the erase service time period 235B to be shorter than the original time period that was configured by the controller, thus enabling for improved latency of the overall execution of the full erase operation.

Erase complete operation 243 can be performed by memory sub-system 110 to finalize the erase operation (e.g., to do any cleanup operations that can be required following an erase operation). After completing erase complete operation 243 memory device 130 can be available for other memory access commands to be executed. In implementations, when erase complete operation 243 completes, it can send notification 246 to the controller, signaling that the current erase service time period 235B can be terminated. When memory sub-system 110 receives the erase complete notification 246, memory sub-system 110 can end erase service time period 230B. In certain implementations, after the full erase operation is completed. memory sub-system 110 can send information related to the actual execution times of each time period to further optimize the configurable erase service time period and command service time period, as explained in more details herein below. In implementations, the erase complete notification 246 can be a message sent from memory device 130 to the controller, a change in a predetermined memory location that can be monitored by the controller, etc.

Figure 3:
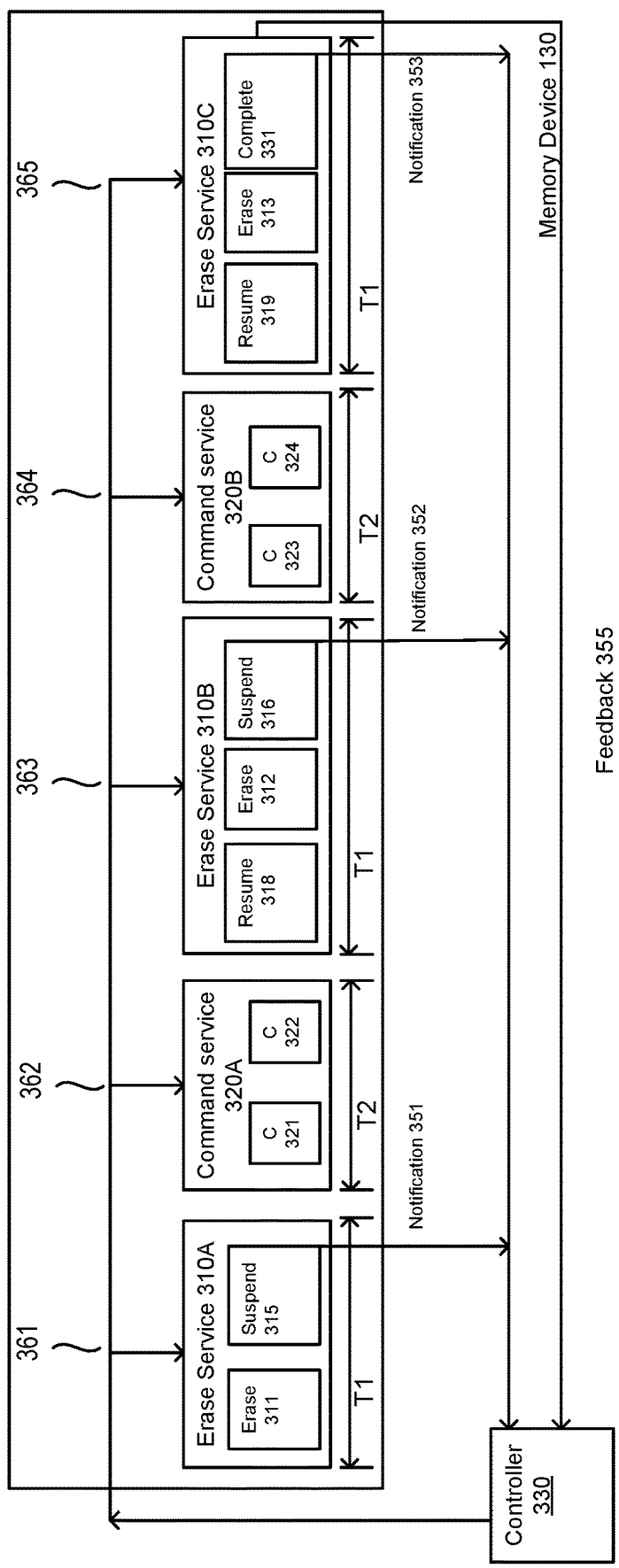
FIG. 3 illustrates an example of an erase operation execution sequence in support of erase suspend and resume operations in memory devices management, in accordance with some embodiments of the present disclosure.

FIG. 3 illustrates an example of an erase operation execution sequence in support of erase suspend and resume operations in memory devices management, in accordance with some embodiments of the present disclosure. Memory sub-system 110 can enable deterministic execution of an erase operation by providing sequences of erase service time periods 310A-C for executing the erase operation, interleaved with command service time periods 320A-B for executing internal or external memory access commands on memory device 130. The execution of erase service time periods 310A-C and command service time periods 320A-B can be managed internally by memory device 130, whereas the duration of each time period and the total number of time periods can be managed by controller 330. Controller 330 can refer to memory sub-system controller 115 of FIG. 1. In an illustrated example, controller 330 can define 3 erase service time periods 310A-C and two command service time periods 320A-B. In other examples, controller 330 can define other numbers of erase service time periods and command service time periods, based on factors including the number of times an erase operation can be suspended and resumes, the total time consumed in a full erase operation execution, the health of memory device 130, etc.

In certain implementations, memory sub-system 110 can define a new command and include the sequence of erase service time periods 310A-C and command service time periods 320A-B within the new command. In this case, controller 330 can send the new command to memory device 130 for processing and memory device 130 can manage the execution of the time periods within the new command. In other implementations, controller 330 can send configuration data to memory device 130 indicating, for example, the number of erase service time periods 310, the number of command service time periods 320, the duration of an erase service time period T1 and the duration of a command service time period T2. In this case, memory device 130 can manage the execution of alternating erase service time periods and command service time periods without intervention from controller 330.

In implementations, when memory sub-system 110 receives a request to perform an erase operation on memory device 130, controller 330 can initiate an erase service time period 310A at operation 361. Erase service time period 310A can have a predetermined duration T1 assigned by the controller. Because this is the first erase service time period to be executed, erase service time period 310A can start executing erase operation 311, without first executing an erase resume operation. Erase operation 311 can execute at least a portion of the full erase operation. Following the execution of erase operation 311, memory sub-system 110 can then execute erase suspend operation 315 within T1 in order to enable the following command service time period 320A to start. In one implementation, erase suspend operation 315 can send notification 351 when completed to controller 330, to signal to the end of erase service time period 310A and that the following command service time period 320A can start.

At operation 362, controller 330 can initiate a command service time period 320A with duration T2 to execute memory access commands C 321-322. Commands C 321-322 can be internal memory access commands (e.g., garbage collection operation, wear leveling operation, etc.). Commands C 321-322 can also be IO operations received by controller 330 (e.g., read operation, write operation). In implementations, memory device 130 can receive commands C 321-322 from controller 330 and can execute the commands within command service time period 320A. In certain implementations, command C321 can be queued during the erase service 310A so that when notification 351 is received, C321 can start executing. In implementation, if memory device 130 did not receive commands from controller 330 and did not have internal memory access commands to execute within a configurable time period (e.g., 20 microseconds), command service time period 320A can be aborted and the next erase service time period 310B can be initiated. Otherwise, memory device 130 can execute commands C 321-322 within T2. When T2 elapses, controller 330 can initiate erase service time period 310B at operation 363.

Similar to erase service time period 310A, erase service time period 310B can have a predetermined duration T1 assigned by controller 330. Erase service time period 310B can start with erase resume operation 318 to resume the previously suspended erase operation. When erase service time period 310B starts, internal and external memory access commands can no longer be processed until the following command service time period is initiated. Memory sub-system 110 can then execute erase operation 312 to execute at least another portion of the full erase operation. Following the execution of erase operation 312, memory sub-system 110 can then execute erase suspend operation 316 within T1, in order to enable the following command service time period 320B to start. In one implementation, erase suspend operation 316 can send notification 352 to controller 330 when completed, to signal to the end of erase service time period 310B and that the following command service time period 320B can start.

At operation 364, controller 330 can initiate a command service time period 320B with duration T2 to execute memory access commands C 323-324. Commands C 323-324 can be internal memory access commands (e.g., garbage collection operation, wear leveling operation, etc.). Commands C 321-322 can also be IO operations initiated by controller 330 (e.g., read operation, write operation). Controller 330 determines the number of commands to be processed within command service time period 320B based on a number of factors including, the time it takes to complete each type of memory access command, the age and health of memory device 130, the quality of service level assigned to memory sub-system 110, etc. In implementations, memory device 130 can receive commands C 323-324 from controller 330 and can execute the commands within T2. When T2 elapses, controller 330 can initiate the last erase service time period 310C at operation 365.

At operation 365, erase service time period 310C can have a predetermined duration T1 assigned by controller 330. Erase service time period 310C can start with erase resume operation 319 to resume the previously suspended erase operation. When erase resume operation completes, memory sub-system 110 can execute erase operation 313 to execute the last portion of the full erase operation. When erase operation 313 completes, memory sub-system 110 can detect that the full erase operation is complete and can execute erase complete operation 331 within T1, signaling the completion of the full erase operation to controller 330. In one implementation, erase complete operation 331 can send notification 353 to controller 330 when completed, to signal to the completion of the full erase operation. Further, in an implementation, memory sub-system 110 can send feedback 355 to controller 330 upon the completion of the erase operation. Feedback 355 can be data related to the actual execution time of the erase service time periods and the command service time periods. Controller 330 can then compare configured versus actual values for the erase service time period and the command service time period and adjust the configured values accordingly. For example, if configured T1 for erase service time periods 310A-C is 10 milliseconds but the actual time for completing erase service time periods 310A-C was between 8 to 8.5 milliseconds, controller 330 can adjust the configured T1 to be 8.5 milliseconds. The next erase operation can then be executed using the new T1 configured value of 8.5 milliseconds. The ability to adjust service time periods enables the solution to accommodate for a deteriorating physical characteristics of memory device 130, or to accommodate a change in the command queue depth of memory sub-system 110, for example.

Figure 4:
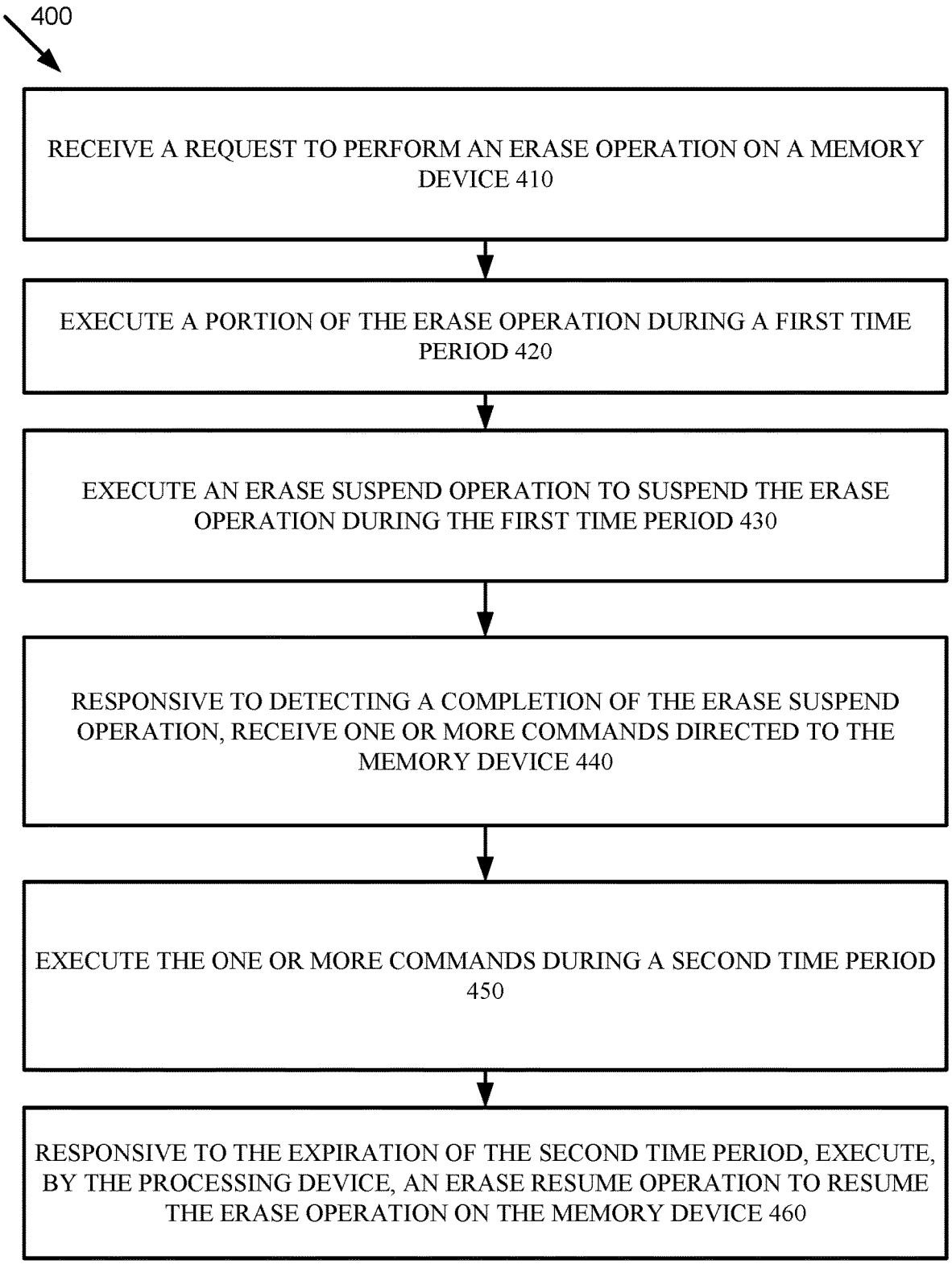
FIG. 4 is a flow diagram of an example method of executing an erase operation and memory access commands in support of erase operation management in a memory sub-system, in accordance with some embodiments of the present disclosure.

FIG. 4 is a flow diagram of an example method of executing an erase operation and memory access commands in support of erase operation management in a memory sub-system, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by erase operation management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives a request to perform an erase operation on memory device 130. The erase operation can be suspended to enable the execution of memory access commands and then later resumed, as explained in more details above. At operation 420, the processing logic can execute a portion of the erase operation during a first time period. As explained above, the first time period can be an erase service time period that is configurable by the controller. The portion of the erase operation and an erase suspend operation can be performed within the erase service time period.

At operation 430, the processing logic can execute an erase suspend operation to suspend the erase operation within the first time period. In certain implementations, the first time period can be configured to account for the maximum time an erase suspend operation can take, as explained in more details herein above. In implementations, when the suspend operation completes, the processing logic can send a notification to the controller indicating that the suspend operation is complete. At operation 440, upon detecting that the suspend operation is complete, the processing logic can start processing a command service time period. During a command service time period, the processing logic can memory access commands directed to the memory device from the controller.

At operation 450, the processing logic can execute the memory access commands at the memory device during a second time period (e.g. a command service time period). In an implementation, the memory access commands can be read commands, write commands, garbage collection operation, etc., as explained in more details herein above. At operation 460, the processing logic can detect that the second time period has expired. Consequently, the processing logic can execute an erase resume operation to resume execution of the suspended erase operation. In certain implementations, the processing logic can start an erase service time period, execute the erase resume operation, then execute the erase operation, as explained in more details herein above.

Figure 5:
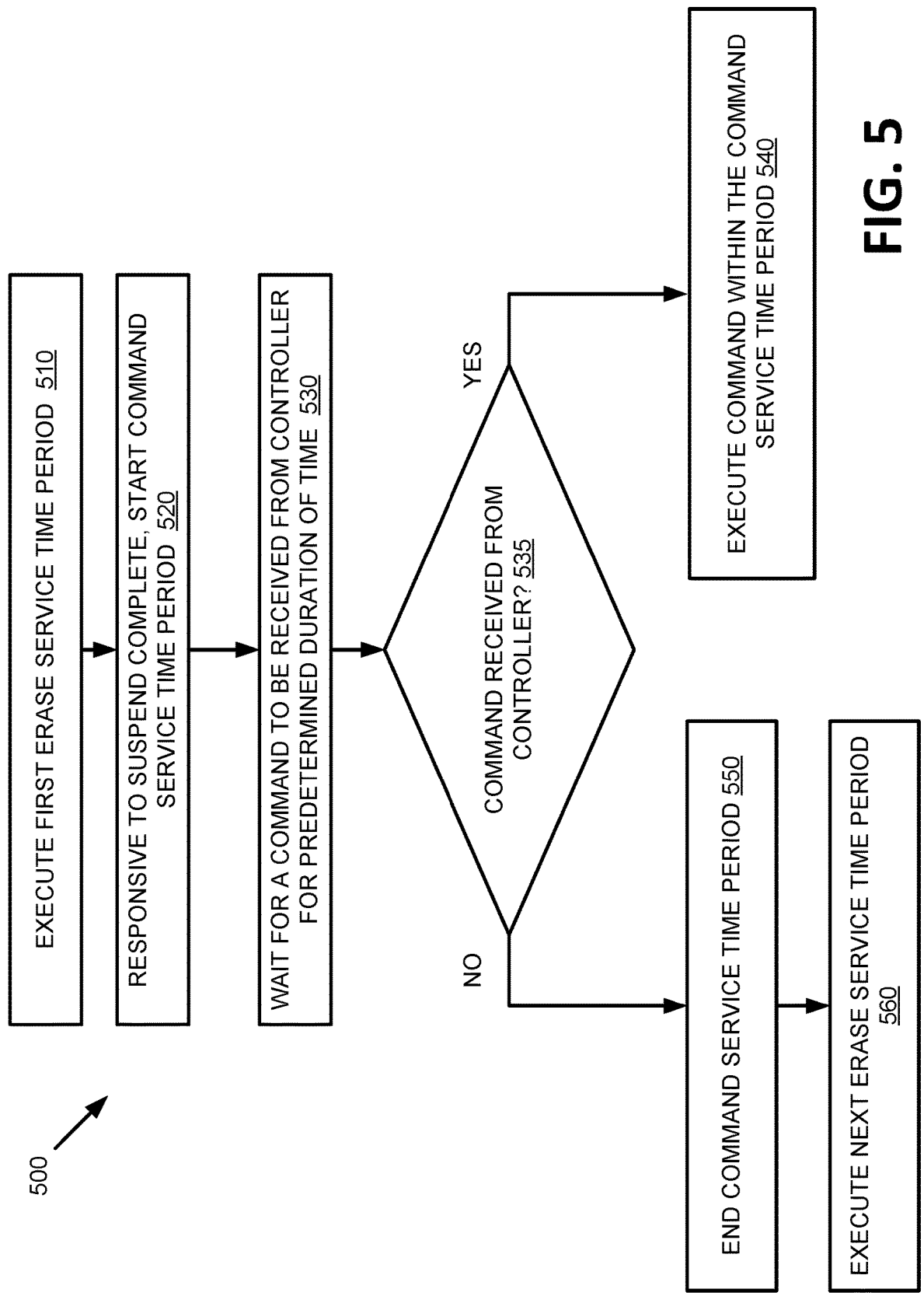
FIG. 5 is a flow diagram of another example method of executing an erase operation and memory access commands in support of erase operation management in a memory sub-system, in accordance with some embodiments of the present disclosure.

FIG. 5 is a flow diagram of another example method of executing an erase operation and memory access commands in support of erase operation management in a memory sub-system, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by erase operation management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic executes a first erase service time period. In embodiments, the processing logic can execute at least a portion of the full erase operation during the first erase service time period, followed by an erase suspend operation, as explained in more details herein above. At operation 520, when the processing logic detects that the erase suspend operation is complete, the processing logic can start a command service time period to execute one or more memory processing commands. At operation 530, if there are no internal commands for processing (e.g., garbage collection, wear leveling, etc.), the processing logic can wait for IO commands to be received from the controller. In implementations, the processing logic can wait for commands for a predetermined duration of time, as explained in more details herein above.

At operation 535, the processing logic can determine whether IO commands have been received from the controller for processing during the predetermined duration of time. If the duration of time elapses and no commands have been received, the processing logic, at operation 550, can determine that no memory access commands are ready to be performed and can terminate the command service time period to preserve processing time. At operation 560, the processing logic can further execute the next erase service time period, such that the next portion of the erase operation can be executed. On the other hand, at operation 540, if the processing logic determines that IO commands have been received from the controller, the processing logic can execute the IO commands within the command service time period, as explained in more details herein above.

Figure 6:
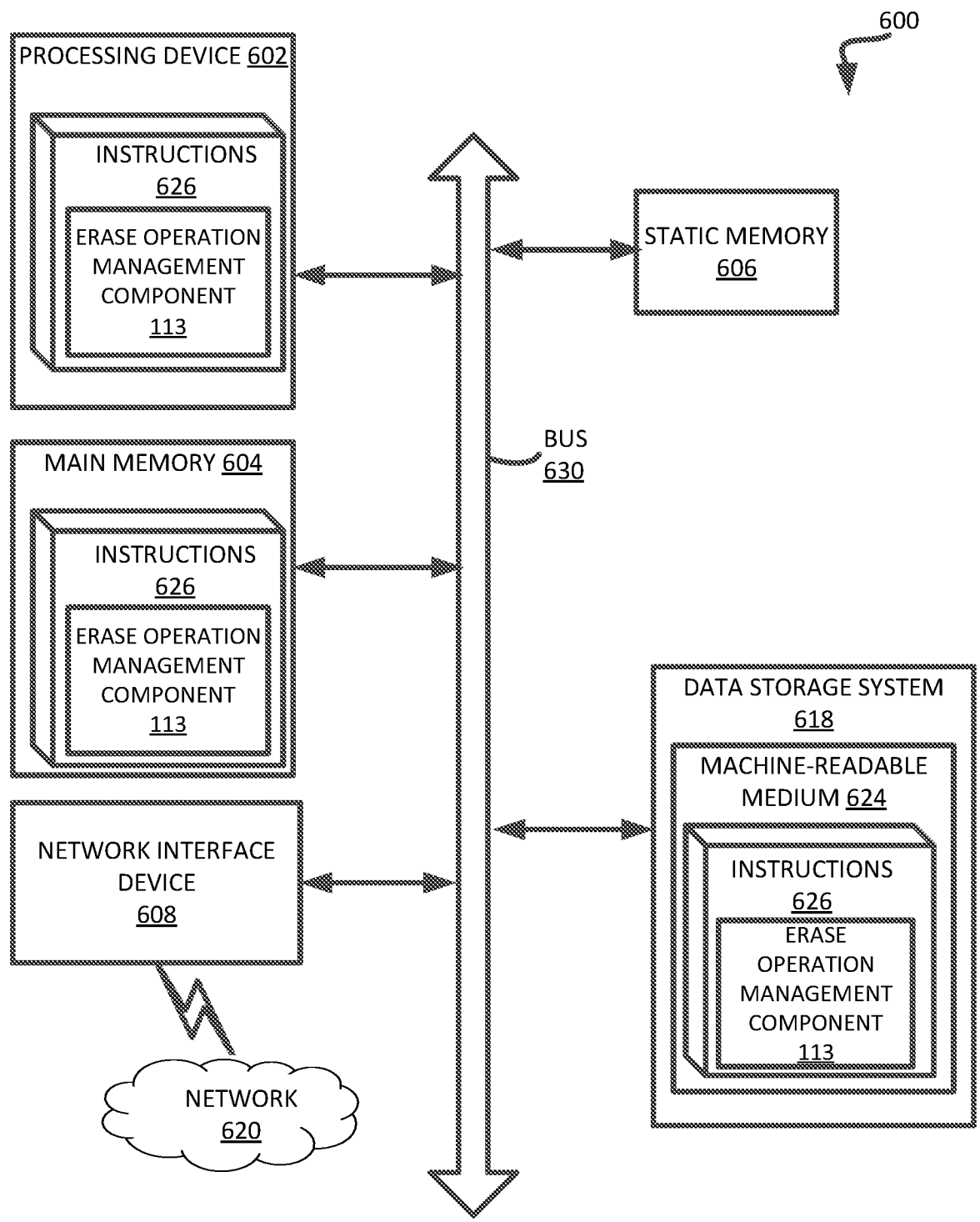
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to erase operation management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to erase operation management component 113 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining, by a processing device, a first time period for executing an erase suspend operation on a memory device;
   executing a portion of an erase operation during the first time period;
   responsive to detecting an expiration of a second time period for executing the portion of the erase operation, executing, during the first time period, the erase suspend operation to suspend the erase operation, wherein the second time period is based on a plurality of execution times of erase operations performed on the memory device;
   responsive to detecting completion of the erase suspend operation, executing one or more commands during a third time period; and
   executing, by the processing device, an erase resume operation to resume the erase operation on the memory device.

2. The method of claim 1, wherein a sequence of the first time period for executing the portion of the erase operation and the third time period for executing the one or more commands is repeated until an execution of the erase operation completes.

3. The method of claim 1, wherein detecting completion of the erase suspend operation further comprises receiving a notification that the erase suspend operation is complete.

4. The method of claim 2, further comprising:
   responsive to a completion of execution of the erase operation:
      receiving, by the processing device, a feedback corresponding to the execution of the erase operation; and
      updating the first time period and the third time period based on the feedback.

5. The method of claim 4, wherein the feedback corresponds to a plurality of actual execution times of the erase operation and the one or more commands.

6. The method of claim 1, further comprising:
   executing at least one of an erase suspend operation, an erase resume operation, or an erase complete operation during the first time period.

7. The method of claim 1, wherein the one or more commands are at least one of a read operation, a write operation, or a garbage collection operation at the memory device.

8. The method of claim 2, further comprising:
   executing a second portion of the erase operation during a subsequent sequence of the first time period;
   executing the erase suspend operation to suspend the erase operation during the subsequent sequence of the first time period;
   responsive to detecting completion of the erase suspend operation, determining whether the one or more commands are received, from a controller, during a fourth time period; and
   responsive to determining that no commands are received during the fourth time period, executing the erase resume operation to resume the erase operation on the memory device.

9. A system comprising:
   a memory device; and
   a processing device, operatively coupled with the memory device, to:
      determine, by the processing device, a first time period for executing an erase suspend operation on the memory device;
      execute a portion of an erase operation during the first time period;
      responsive to detecting an expiration of a second time period for executing the portion of the erase operation, execute, during the first time period, the erase suspend operation to suspend the erase operation, wherein the second time period is based on a plurality of execution times of erase operations performed on the memory device;

responsive to detecting completion of the erase suspend operation, execute one or more commands during a third time period; and execute, by the processing device, an erase resume operation to resume the erase operation on the memory device.

10. The system of claim 9, wherein a sequence of the first time period for executing the erase suspend operation and the third time period for executing the one or more commands is repeated until an execution of the erase operation completes.

11. The system of claim 9, wherein to detect completion of the erase suspend operation, the processing device is further to receive a notification that the suspend operation is complete.

12. The system of claim 10, wherein the processing device is further to:

responsive to a completion of execution of the erase operation:

receive, by the processing device, a feedback corresponding to the execution of the erase operation; and update the first time period and the third time period based on the feedback.

13. The system of claim 12, wherein the feedback corresponds to a plurality of actual execution times of the erase operation and the one or more commands.

14. The system of claim 9, wherein the processing device is further to:

execute at least one of an erase suspend operation, an erase resume operation, or an erase complete operation during the first time period.

15. The system of claim 9, wherein the one or more commands are at least one of a read operation, a write operation, or a garbage collection operation at the memory device.

16. The system of claim 10, wherein the processing device is further to:

execute a second portion of the erase operation during a subsequent sequence of the first time period;

execute the erase suspend operation to suspend the erase operation during the subsequent sequence of the first time period;

responsive to detecting completion of the erase suspend operation, determine whether the one or more commands are received, from a controller, during a fourth time period; and responsive to determining that no commands are received during the fourth time period, execute the erase resume operation to resume the erase operation on the memory device.

17. A non-transitory computer-readable storage medium comprising instructions that, when executed by a processing device, cause the processing device to:

determine, by the processing device, a first time period for executing an erase suspend operation on a memory device;

execute a portion an erase operation during the first time period;

responsive to detecting an expiration of a second time period for executing the portion of the erase operation, execute, during the first time period, the erase suspend operation to suspend the erase operation, wherein the second time period is based on a plurality of execution times of erase operations performed on the memory device;

responsive to detecting completion of the erase suspend operation, determine whether one or more commands are received during a wait time period; and execute, by the processing device, an erase resume operation to resume the erase operation on the memory device.

18. The non-transitory computer-readable storage medium of claim 17, wherein the processing device is further to:

responsive to determining that the one or more commands are received during the wait time period, execute the one or more commands during a third time period; and responsive to an expiration of the third time period, execute the erase resume operation to resume the erase operation on the memory device.

19. The non-transitory computer-readable storage medium of claim 18, wherein the processing device is further to:

responsive to a completion of execution of the erase operation:

receive a feedback corresponding to the execution of the erase operation; and update the first time period and the third time period based on the feedback.

20. The non-transitory computer-readable storage medium of claim 19, wherein the feedback corresponds to a plurality of actual execution times of the erase operation and the one or more commands.

* * * * *